US008731398B2

(12) United States Patent
Akiyama et al.

(10) Patent No.: US 8,731,398 B2
(45) Date of Patent: May 20, 2014

(54) OPTICAL NETWORK SYSTEM AND WDM APPARATUS

(75) Inventors: Yuji Akiyama, Tokyo (JP); Kazuo Kubo, Tokyo (JP); Sota Yoshida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 215 days.

(21) Appl. No.: 13/421,327

(22) Filed: Mar. 15, 2012

(65) Prior Publication Data

US 2012/0237199 A1 Sep. 20, 2012

(30) Foreign Application Priority Data

Mar. 16, 2011 (JP) ................................. 2011-058424

(51) Int. Cl.
*H04B 10/00* (2013.01)

(52) U.S. Cl.
USPC .................................................. 398/5; 398/7

(58) Field of Classification Search
USPC ......................................................... 398/1–8
See application file for complete search history.

(56) References Cited

U.S. PATENT DOCUMENTS

| 5,216,666 | A | * | 6/1993 | Stalick | 370/222 |
| 5,638,358 | A | * | 6/1997 | Hagi | 370/228 |
| 6,915,075 | B1 | * | 7/2005 | Oberg et al. | 398/9 |
| 7,099,578 | B1 | * | 8/2006 | Gerstel | 398/5 |
| 7,613,392 | B2 | * | 11/2009 | Gerstel | 398/5 |
| 7,877,008 | B2 | * | 1/2011 | Li et al. | 398/5 |
| 8,045,863 | B2 | * | 10/2011 | Meagher et al. | 398/193 |
| 8,391,707 | B2 | * | 3/2013 | Wellbrock et al. | 398/5 |
| 8,412,038 | B2 | * | 4/2013 | Natori | 398/2 |
| 8,488,622 | B2 | * | 7/2013 | Sakamoto et al. | 370/464 |
| 8,588,613 | B1 | * | 11/2013 | Culpepper | 398/98 |
| 2003/0039003 | A1 | | 2/2003 | Jakobik et al. | |
| 2003/0161629 | A1 | * | 8/2003 | Frascolla et al. | 398/5 |
| 2008/0080860 | A1 | | 4/2008 | Katagiri | |
| 2010/0150558 | A1 | * | 6/2010 | Wisseman | 398/79 |
| 2011/0116789 | A1 | * | 5/2011 | Wellbrock et al. | 398/5 |

(Continued)

FOREIGN PATENT DOCUMENTS

| EP | 2 337 230 | 6/2011 |
| JP | 8-274820 | 10/1996 |

(Continued)

OTHER PUBLICATIONS

European Search Report in English mailed on Jan. 30, 2014 in corresponding European patent application No. 12159448.5, 5 pages.

*Primary Examiner* — Agustin Bello
(74) *Attorney, Agent, or Firm* — Oblon, Spivak, McClelland, Maier & Neustadt, L.L.P.

(57) ABSTRACT

An optical network system that performs transmission of N:1 protection includes a node that includes transmission-side operating muxponders that multiplex client signals for every M-channel signal bundle and convert multiplexed signals into optical signals having different wavelengths, transmission-side optical couplers that branch the client signals into two channels of operating and redundant, transmission-side optical switches each selecting one channel from redundant signals as a redundant client signal, and a transmission-side redundant muxponder that performs a predetermined transmission-side process according to an accommodation mode set on the redundant client signal and then multiplexes the redundant client signals, converts the multiplexed signal into an optical signal having a wavelength different from that of the operating signal, thereby making the accommodation mode settable for each channel in an independent manner.

20 Claims, 6 Drawing Sheets

(56) References Cited

U.S. PATENT DOCUMENTS

2011/0158648 A1    6/2011    Kubo et al.
2011/0311217 A1*  12/2011  Horiuchi et al. .................. 398/5
2012/0237199 A1*  9/2012   Akiyama et al. .................. 398/2
2013/0195440 A1*  8/2013   Tominaga ......................... 398/2

FOREIGN PATENT DOCUMENTS

| | | |
|---|---|---|
| JP | 2010-16791 | 1/2010 |
| WO | 03/036341 | 5/2003 |
| WO | WO 2010/044154 A1 | 4/2010 |

\* cited by examiner

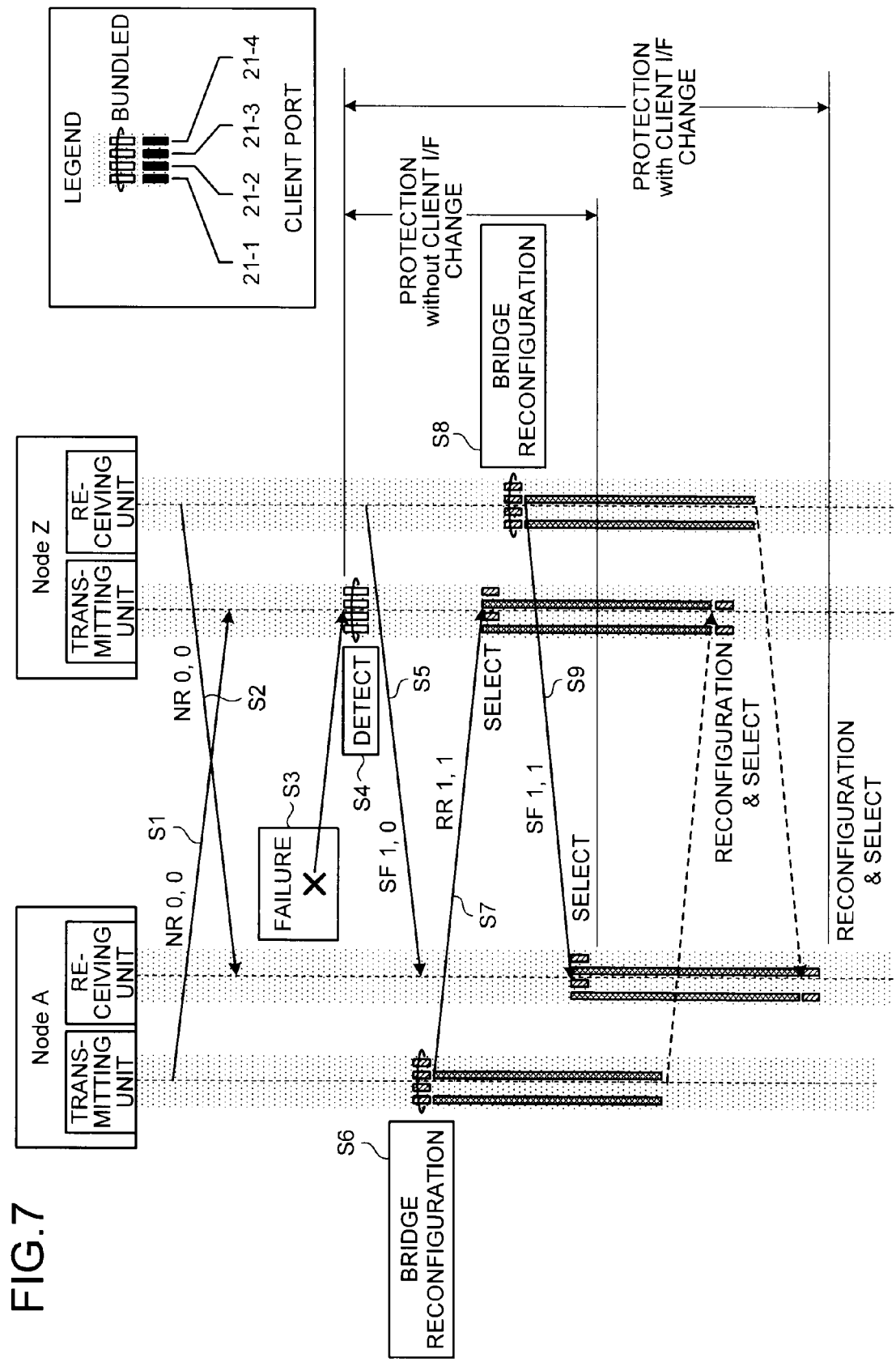

OPTICAL NETWORK SYSTEM AND WDM APPARATUS

BACKGROUND OF THE INVENTION

1. Field of the Invention

The present invention relates to an optical network system and a WDM apparatus that perform switching between a redundant system and an operating system in an optical network having the redundant system.

2. Description of the Related Art

For example, a technique described in International Publication No. WO2010/044154 has been known as a redundant system switching technology in an optical network including a plurality of accommodation modes and a redundant system. In International Publication No. WO2010/044154, a method of implementing a WDM (Wavelength Division Multiplexing) apparatus (WDM transmission apparatus) has been disclosed, in which a plurality of client interfaces are protected in a mixed manner and a transponder having only one client interface is adopted as a transceiver in an N:1 protection apparatus that uses only one redundant wavelength by applying a transponder that can support a plurality of client interface types by changing accommodation modes to a redundant path of an N:1 redundant protection apparatus.

However, International Publication No. WO2010/044154 is based on an assumption that the transponder has only one client interface, and therefore there is no disclosure on an apparatus configuration method and a method of controlling client interfaces accommodated in a mixed multiplexing manner when performing redundant switching in a WDM apparatus that uses a muxponder accommodating a plurality of types of client interfaces in a mixed multiplexing manner.

Therefore, the technique described in International Publication No. WO2010/044154 can be only applied to a case where a transponder applied to a redundant path has only one client interface, and there has still been a problem that it is not possible to perform N:1 protection by one redundant wavelength when using a muxponder that accommodates a plurality of client interfaces in a multiplexing manner.

SUMMARY OF THE INVENTION

It is an object of the present invention to at least partially solve the problems in the conventional technology.

According to an aspect of the present invention, there is provided an optical network system that performs transmission of N:1 protection with respect to client signals of M×N channels constituting a signal bundle with M channels, where M is an integer equal to or larger than 2 and N is an integer equal to or larger than 1, wherein the client signal includes a plurality of types of signals, and the optical network system comprises: a transmission-side optical redundant switching device including a transmission-side operating muxponder that generates a multiplexed signal for each of the signal bundles by performing a multiplexing process including a predetermined transmission-side process according to a type of the client signal on the client signals, and converts each multiplexed signal into an operating optical signal having a different wavelength, a transmission-side optical coupler that branches the client signal into an operating signal and a redundant signal for each channel of the client signals, M parallel transmission-side optical switches each selecting one channel from among the redundant signals of the N signal bundles, and outputs a selected redundant signal as a redundant client signal, and a transmission-side redundant muxponder that generates a multiplexed signal by performing a multiplexing process including a predetermined transmission-side process according to a type of the signal on the M-channel redundant client signals, converts the multiplexed signal into a redundant optical signal having a wavelength different from that of the operating optical signal, and performs a process according to the type by setting an accommodation mode corresponding to the type in the predetermined transmission-side process, thereby making the accommodation mode settable for each channel in an independent manner; and a reception-side optical redundant switching device including a first WDM device that multiplexes the operating optical signal and the redundant optical signal by a wavelength, and outputs a wavelength-multiplexed signal to an optical transmission path, a second WDM device that demultiplexes a wavelength-multiplexed signal input from the optical transmission path, and outputs wavelength-demultiplxed signals, a reception-side operating muxponder that generates an output client signal by performing a demultiplexing process including a predetermined reception-side process according to a type of the client signal on the operating optical signal from among the wavelength-demultiplexed signals, a reception-side redundant muxponder that generates an output client signal by performing a demultiplexing process including a predetermined reception-side process according to a type of the client signal on the redundant signal from among the wavelength-demultiplexed signals, and performs a process according to the type by setting an accommodation mode corresponding to the type in the predetermined reception-side process, thereby making the accommodation mode settable for each channel in an independent manner, a reception-side optical coupler that is provided for each channel of the client signals and optically couples an output client signal generated by the reception-side redundant muxponder and an output client signal generated by the reception-side operating muxponder, and a reception-side optical switch that selects a reception-side optical coupler corresponding to a channel selected by the transmission-side optical switch as an output destination of an output client signal generated by the reception-side redundant muxponder, and outputs an output client signal generated by the reception-side redundant muxponder to a selected reception-side optical coupler.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is an example of a procedure of controlling accommodation-mode switching.

DETAILED DESCRIPTION OF THE PREFERRED EMBODIMENTS

Exemplary embodiments of an optical network system and a WDM apparatus according to the present invention will be explained below in detail with reference to the accompanying drawings. The present invention is not limited to the embodiments.

First Embodiment

Figure 1:
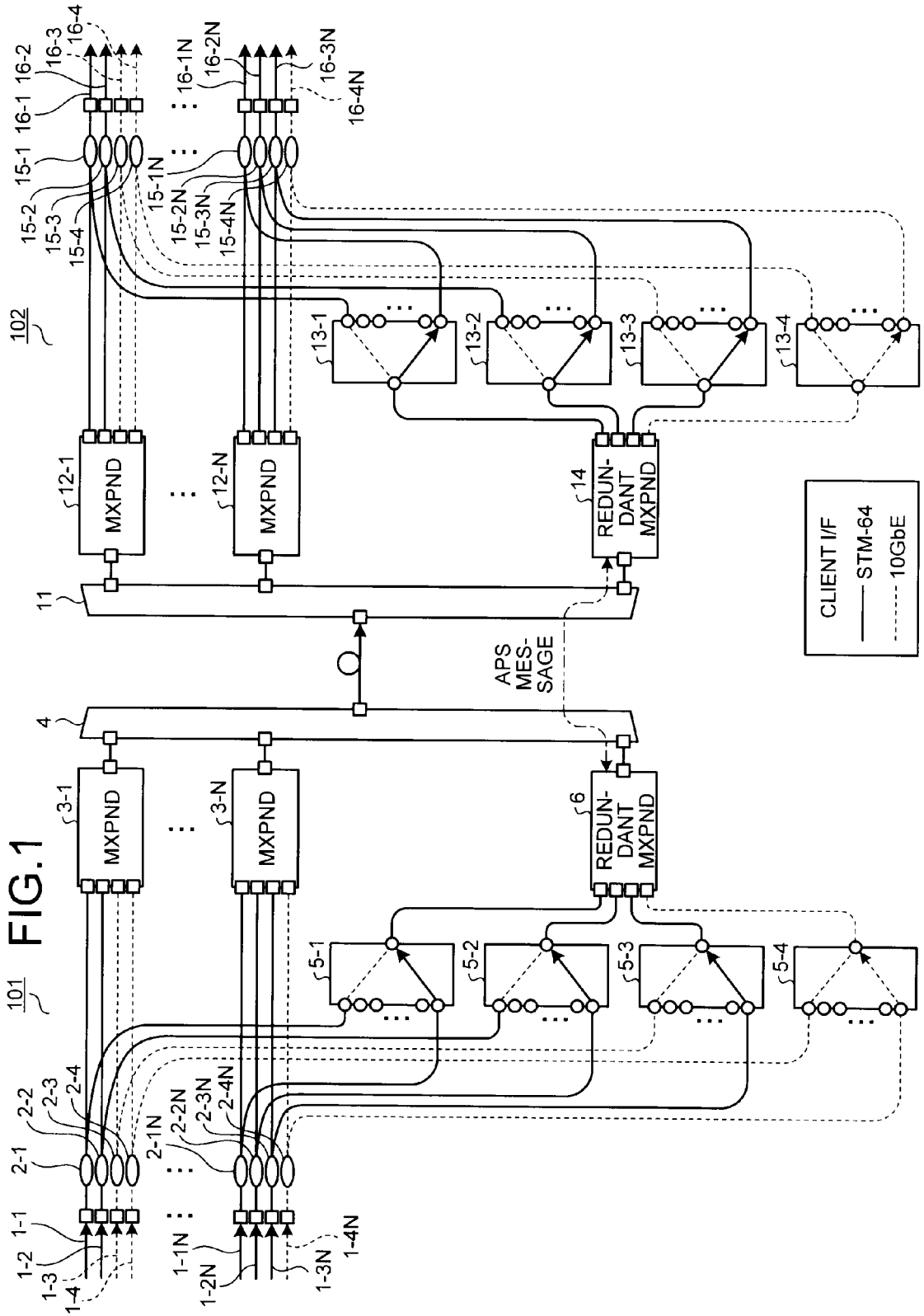
FIG. 1 is a configuration example of an optical network system.

FIG. 1 is a configuration example of an optical network system according to a first embodiment of the present invention. As shown in FIG. 1, the optical network system according to the present embodiment includes a node 101 that is a WDM apparatus and a node 102 that is another WDM apparatus, where the node 101 and the node 102 are connected to each other with an optical transmission path. FIG. 1 depicts a case where the node 101 functions as a transmission apparatus and the node 102 functions as a reception apparatus, that is, FIG. 1 depicts only a portion related to transmission (a transmitting unit) for the node 101 and only a portion related to reception (a receiving unit) for the node 102. The transmitting unit and the receiving unit have functions as optical redundant switching devices (transmission-side optical redundant switching device and reception-side optical redundant switching device, respectively) that switch signals to be transmitted by using a redundant wavelength.

The node 101 includes transmission-side operating muxponders (MXPNDs) 3-1 to 3-N (N is an integer larger than 1) for multiplexing 4-channel client signals. The node 101 further includes a transmission-side redundant muxponder (Redundant MXPND) 6.

Input client signals 1-1 to 1-4N of which every four channels constitute a client signal bundle (a signal bundle multiplexed as the same multiplexed signal) are input to the node 101. For example, in the example shown in FIG. 1, the input client signals 1-1 to 1-4 constitute a client signal bundle. The input client signals 1-1 to 1-4N are then branched into two signals by transmission-side optical couplers 2-1 to 2-4N, respectively.

Among the signals branched by the transmission-side optical couplers 2-1 to 2-4N, one is input to any one of transmission-side operating muxponders 3-1 to 3-N, and the other is input to any one of transmission-side optical switches 5-1 to 5-4. It is configured that four client signals (four branched signals) constituting a client signal bundle are input to different ones of the transmission-side optical switches 5-1 to 5-4, respectively. In this case, the signals are input such that the input client signal 1-1 is input to the transmission-side optical switch 5-1, the input client signal 1-2 is input to the transmission-side optical switch 5-2, the input client signal 1-3 is input to the transmission-side optical switch 5-3, the input client signal 1-4 is input to the transmission-side optical switch 5-4, the input client signal 1-5 is input to the transmission-side optical switch 5-1, the input client signal 1-6 is input to the transmission-side optical switch 5-2 onwards.

The transmission-side optical switches 5-1 to 5-4 select one of client signals input according to a client signal bundle to be protected (to be transmitted using the transmission-side redundant muxponder 6), and input the selected client signal to the transmission-side redundant muxponder 6. The transmission-side operating muxponders 3-1 to 3-N multiplexes the four signals of the input client signal bundle to generate optical signals having different wavelengths from each other, respectively, and input the generated optical signals to a transmission-side WDM (wavelength division multiplexing unit) 4. The transmission-side redundant muxponder 6 generates an optical signal having a wavelength different from those of the transmission-side operating muxponders 3-1 to 3-N by multiplexing the four signals of the input client signal bundle by switching client accommodation modes according to a type of the client signal, and input the generated optical signal to the transmission-side WDM (wavelength division multiplexing unit) 4. The optical signal input to the transmission-side WDM (wavelength division multiplexing unit) 4 wavelength-division-multiplexed by the transmission-side WDM 4 and transmitted to the node 102 via the optical transmission path.

A reception-side WDM (wavelength demultiplexing unit) 11 of the node 102 demultiplexes the input optical signal by the wavelength, and inputs the demultiplexed optical signal to reception-side operating muxponders 12-1 to 12-N and a reception-side redundant muxponder 14. Because the reception-side operating muxponders 12-1 to 12-N and the reception-side redundant muxponder 14 use different wavelengths from each other, it is possible to determine the reception-side operating muxponders 12-1 to 12-N or the reception-side redundant muxponder 14 to input the signal according to the wavelength. Each of the reception-side operating muxponders 12-1 to 12-N generates a client signal bundle by branching the input wavelength-demultiplexed signal into four channels, and inputs the branched signals to connected four couplers from among reception-side optical couplers 15-1 to 15-4N.

The reception-side redundant muxponder 14 branches the input wavelength-demultiplexed signal into four signals to generate a client signal bundle, and inputs the branched signals to reception-side optical switches 13-1 to 13-4, respectively. Each of the reception-side optical switches 13-1 to 13-4 selects a reception-side optical coupler of an output destination (one of the reception-side optical couplers 15-1 to 15-4N) according to the client signal bundle to be protected (which is transmitted via the transmission-side redundant muxponder 6), and outputs the input signal to the selected reception-side optical coupler.

The reception-side optical couplers 15-1 to 15-4N outputs signals input from either one of the reception-side operating muxponders 12-1 to 12-N or the reception-side redundant muxponder 14 as output client signals 16-1 to 16-4N, respectively. In this case, in order to prevent two signals input to each of the reception-side optical couplers 15-1 to 15-4N from colliding when the two signals are combined, the reception-side operating muxponders 12-1 to 12-N and the reception-side redundant muxponder 14 are configured to shut down one of the two signals input to the same one of the reception-side optical couplers 15-1 to 15-4N.

Although an example of constituting a client signal bundle with four-channel client signals is explained in the present embodiment, the number of client signals constituting the client signal bundle is not limited to four, and the number can be set arbitrarily. In this case, the transmission-side operating muxponders 3-1 to 3-N, the transmission-side redundant muxponder 6, the reception-side operating muxponders 12-1 to 12-N, and the reception-side redundant muxponder 14 are configured to respectively have as many input ports as the number of client signals constituting the client signal bundle. Furthermore, the number of the transmission-side optical couplers, the transmission-side optical switches, the reception-side optical couplers, and the reception-side optical switches are set according to the number of client signals.

Furthermore, in FIG. 1, although the node 101 includes the transmitting unit and the node 102 includes the receiving unit, the node 101 and the node 102 respectively include both the transmitting unit and the receiving unit. Furthermore, the transmitting unit and the receiving unit can be implemented with the same hardware so that each structural element supports both the transmission and the reception (the transmission-side optical couplers 2-1 to 2-4N, the transmission-side optical switches 5-1 to 5-4, the transmission-side operating muxponders 3-1 to 3-N, the transmission-side redundant muxponder 6, and the transmission-side WDM 4 have functions of the reception-side optical couplers 15-1 to 15-4N, the reception-side optical switches 13-1 to 13-4, the reception-side operating muxponders 12-1 to 12-N, the reception-side redundant muxponder 14, and the reception-side WDM 11, respectively).

Figure 2:
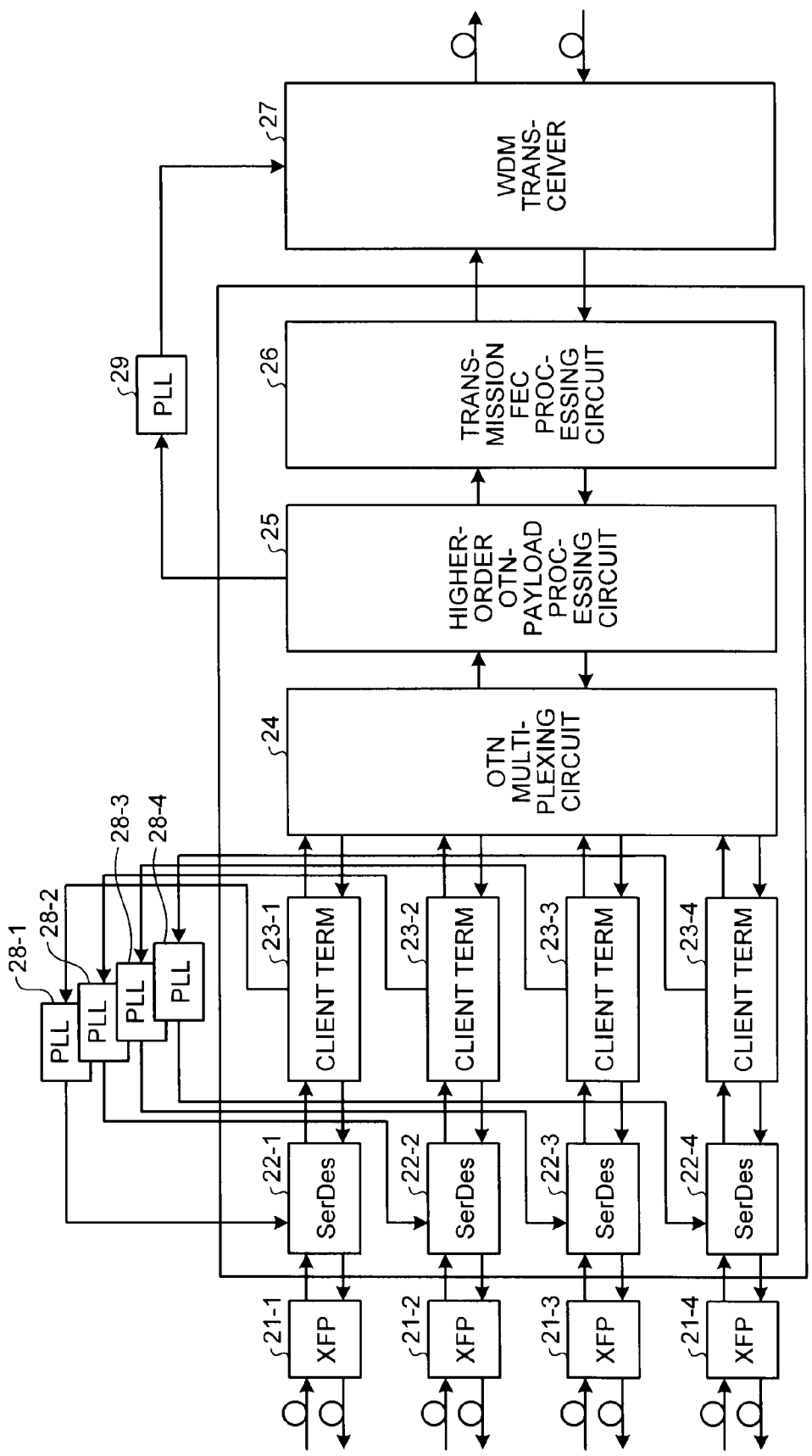
FIG. 2 is a configuration example of a redundant muxponder.

FIG. 2 is a configuration example of a redundant muxponder according to the present embodiment. The redundant muxponder shown in FIG. 2 represents a configuration example having both functions of the transmission-side redundant muxponder 6 and the reception-side redundant muxponder 14.

In the present embodiment, the client signal to be input is either one of an STM (Synchronous Transport Module)-64 or 10 GbE. Furthermore, in transmission between the node 101 and the node 102, an optical signal is transmitted as an OTN frame (for example, OUT (Optical Transform Unit) 2 frame).

The interface types of client signals constituting the same client signal can be different from each other or the same. Although the client signal is considered to be either the STM-64 signal or the 10 GbE signal in this example, a client signal of a different interface type can be included. The example shown in FIG. 1 represents a case where the input client signals 1-1 and 1-2 are STM-64 signals and the input client signals 1-3 and 1-4 are 10 GbE signals.

An operation according to the present embodiment is explained with reference to FIG. 2. A transmitting operation is explained first. The four-channel client signal is input to XFP modules 21-1 to 21-4 via the transmission-side optical switches 5-1 to 5-4, respectively. The XFP (10 Gigabit Small Form Factor Pluggable) modules 21-1 to 21-4 converts the input client signal into serial electrical signals, and respectively outputs the serial electrical signals to SerDes (Serializer/Deserializer) 22-1 to 22-4.

The SerDes 22-1 to 22-4 convert the input serial electrical signals into parallel electrical signals and respectively outputs the parallel electrical signals to client-signal terminating circuits (Client Term) 23-1 to 23-4. The client-signal terminating circuits 23-1 to 23-4 perform signal termination processes according to interface types of the input client signals to generate low-order payload data, outputs the generated low-order payload data to an OTN multiplexing circuit 24, extracts client clocks based on the input client signals by clock extracting circuits according to the interface types, and outputs the extracted client clocks to client PLL circuits (PLL (Phase Lock Loop)) 28-1 to 28-4, respectively.

The client PLL circuits 28-1 to 28-4 perform processes such as jitter suppression on the client clocks extracted by the client-signal terminating circuits 23-1 to 23-4, and outputs the client clocks to the SerDes 22-1 to 22-4, respectively. The SerDes 22-1 to 22-4 perform serial-to-parallel conversion processes based on the input client clocks.

The OTN multiplexing circuit 24 performs a process of multiplexing the input low-order payload data according to the interface type to generate a low order frame accommodating the client signal (low-order payload data), and outputs the generated low order frame to a higher-order OTN-payload processing circuit (HO (Higher Order) OPU (Optical channel Payload Unit) 3/HO ODU (Optical Data Unit) 3 Mapper) 25.

Figure 3:
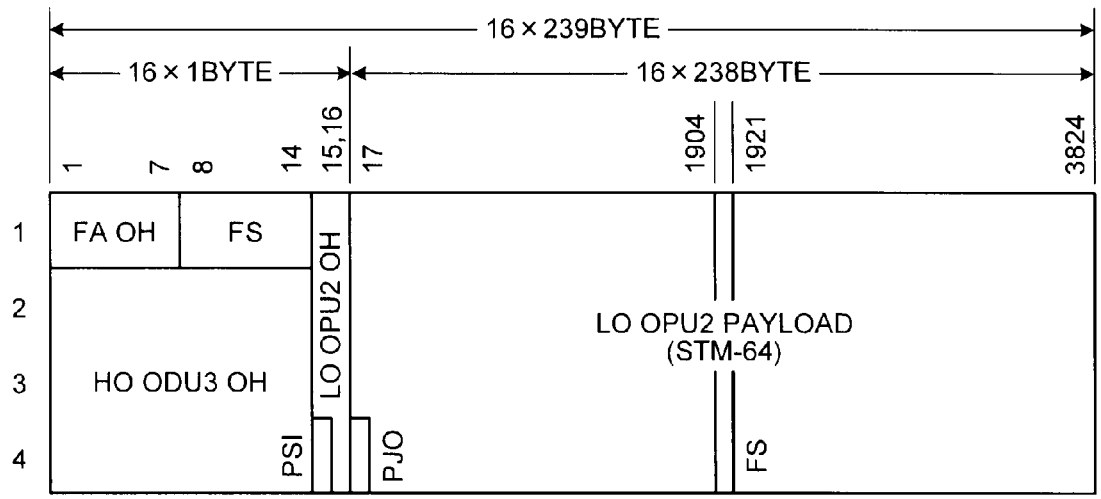
FIG. 3 is an example of a frame configuration.
Figure 4:
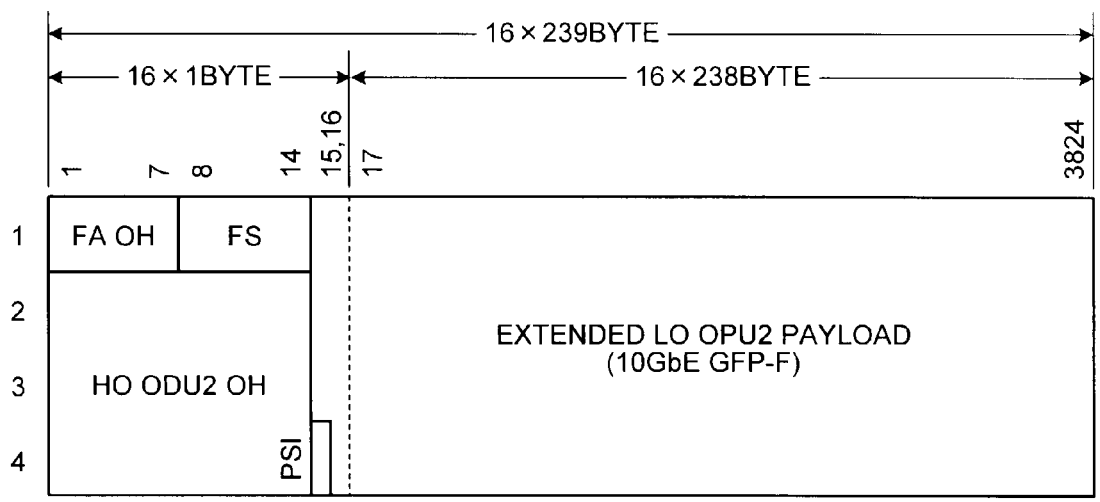
FIG. 4 is an example of a frame configuration of low-order payload data.

FIGS. 3 and 4 are an example of a frame configuration of low-order payload data generated by the OTN multiplexing circuit 24. FIG. 3 is an example of accommodating a client signal in an LO (Low Order) ODU2 frame compliant with ITU-T (International Telecommunication Union Telecommunication Standardization Sector) G.709 when the client signal is a STM-64 signal, and FIG. 4 is an example of accommodating a client signal in an LO (Low Order) ODU2 frame when the client signal is the 10 GbE signal. Although a configuration example of the LO ODU2 frame is shown as the low-order frame in this example, the configuration of the low-order frame is not limited thereto, and there is no limitation on the configuration of the low-order frame, which can be ODTU23, ODTUG3, or the like.

The higher-order OTN-payload processing circuit 25 performs a predetermined process including an alarm monitoring process on the input low-order frame to generate higher-order OTN payload data, and outputs the generated higher-order OTN payload data to a transmission FEC (Forward Error Correction) processing circuit 26. The higher-order OTN-payload processing circuit 25 further outputs a transmission clock generated in a separate manner to a transmission PLL circuit (PLL) 29. A method of generating the transmission clock can be any possible method other than a method extracting a clock from the client signal (that is, as long as it is a method to generate the clock independently of the client signal). The transmission FEC processing circuit 26 performs a transmission-side error-correction coding process on the higher-order OTN payload data, and outputs a result of the process to a WDM transceiver (40G WDM Transceiver) 27 as a transmission parallel electrical signal.

Figure 5:
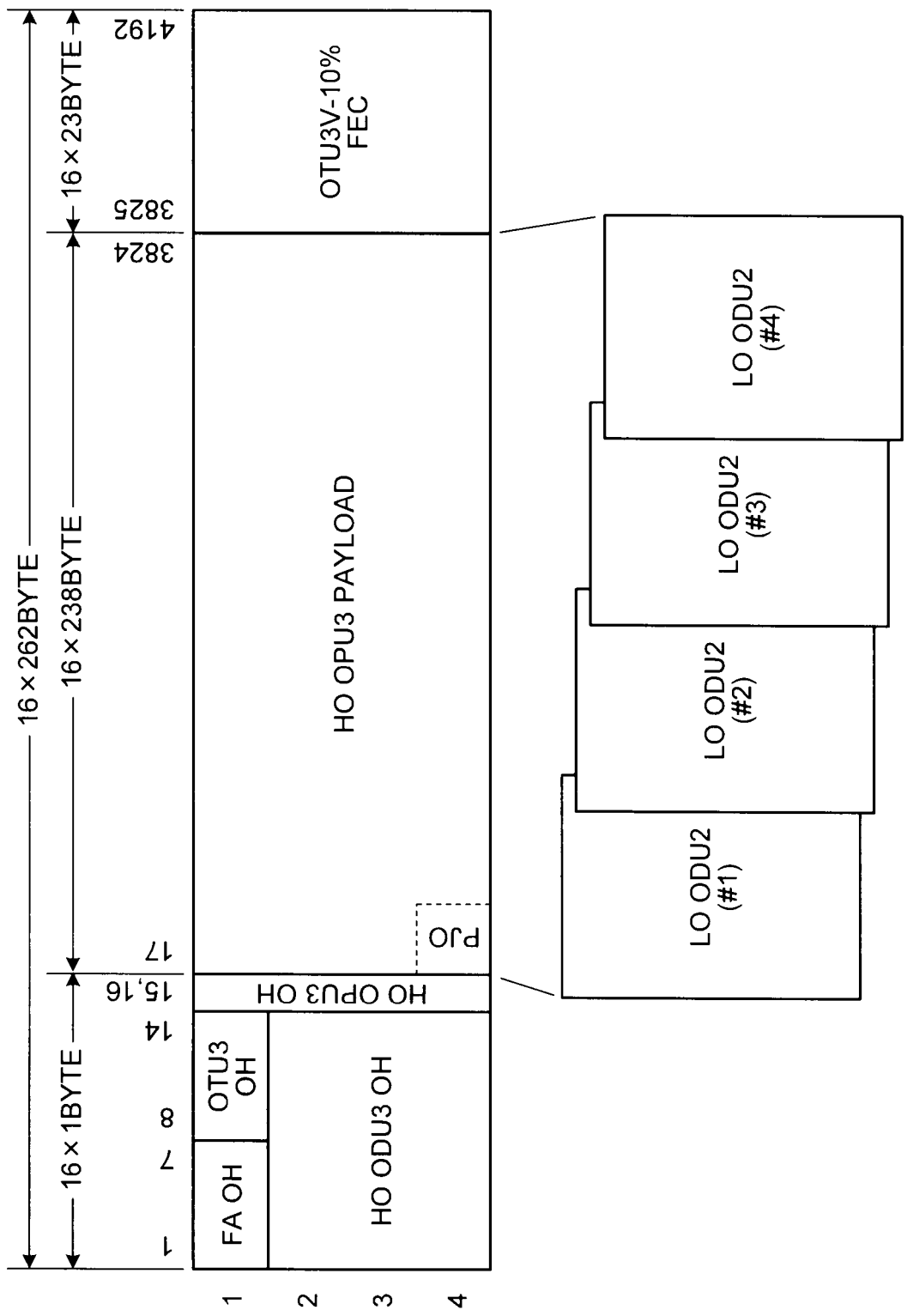
FIG. 5 is a configuration example of a higher-order frame accommodating low-order frames in a multiplexing manner.

FIG. 5 is a configuration example of a higher-order frame accommodating low-order frames in a multiplexing manner. FIG. 5 shows a configuration example when the higher-order frame is an HO OPU3 frame compliant with ITU-T G.709 of OTU3V-10%. The higher-order OTN-payload processing circuit 25 generates a portion except for a portion of the OTU3V-10% FEC (FEC) shown in FIG. 5, and the transmission FEC processing circuit 26 generates the portion of the OTU3V-10% FEC (FEC) shown in FIG. 5. Although a configuration example of an HO ODU3 frame is shown in this example as the higher-order frame, the configuration of the higher-order frame is not limited thereto, and there is no limitation on the configuration of the higher-order frame, which can be HO OPU3 or the like.

The transmission PLL circuit 29 performs a process such as jitter suppression on the input transmission clock, and inputs a result of the process to the WDM transceiver 27. The WDM transceiver 27 performs a parallel-to-serial conversion and an electrical-to-optical conversion on the transmission parallel electrical signal based on the input transmission cock, and outputs a result of the process as a WDM transmission signal light having a predetermined wavelength.

With the above operations, the four-channel client signals are terminated and multiplexed, output as a WDM transmission signal light, and transmitted to the reception side via the WDM 4.

A receiving operation is explained next. At the time of reception, the flow of the signal becomes a reversed flow of the signal at the time of transmission. First, the WDM transceiver 27 performs a serial-to-parallel conversion and an optical-to-electrical conversion on an WDM transmission signal light input from the WDM 11, and inputs a result of the process to the transmission FEC processing circuit 26 as a parallel electrical signal. The transmission FEC processing circuit 26 performs a reception-side error-correction coding process on the input parallel electrical signal, and outputs a result of the process to the higher-order OTN-payload processing circuit 25.

The higher-order OTN-payload processing circuit 25 performs a predetermined process including an alarm monitoring process based on the higher-order frame input from the transmission FEC processing circuit 26 as the parallel electrical signal, extracts the higher-order OTN payload data, and outputs the extracted higher-order OTN payload data to the OTN multiplexing circuit 24. The OTN multiplexing circuit 24 separates the higher-order OTN payload data into low-order frames, and outputs the separated low-order frames to the respective client-signal terminating circuits 23-1 to 23-4.

The client-signal terminating circuits 23-1 to 23-4 perform terminating processes on the low-order frames according to a type of the client signal, and outputs results of the processes to the SerDes 22-1 to 22-4, respectively. The SerDes 22-1 to 22-4 converts the input parallel electrical signals into serial electrical signals, and outputs the serial electrical signals to the XFPs 21-1 to 21-4, respectively.

The XFPs 21-1 to 21-4 converts the input serial electrical signals into the client signals, and outputs the client signals.

In the present embodiment, as described above, the client PLL circuits 28-1 to 28-4 of the respective channels and the transmission PLL circuit 29, which generate the client clocks, operate in an independent manner. Therefore, even if the accommodation mode of the client signal (a mode corresponding to an interface type of the client signal accommodated by the redundant muxponder) is changed, the transmission signal clock is not affected by the client clock, and it is possible to switch the accommodation modes of the four client signals at separate timings in an independent manner without having any interference between the client signals.

Although configurations of the transmission-side operating muxponders 3-1 to 3-N and the reception-side operating muxponders 12-1 to 12-N are not particularly limited, the same configuration can be taken as the configuration of the redundant muxponder shown in FIG. 2. However, the transmission-side operating muxponders 3-1 to 3-N and the reception-side operating muxponders 12-1 to 12-N are not necessarily to be provided independently of the client PLL circuits 28-1 to 28-4 and the transmission PLL circuit 29, and it is not necessary to make the interface types of the four client signals respectively settable in an independent manner (for example, all the interface types of the four client signals can be fixed, and the interface types of the four client signals can be changed in a collective manner).

Figure 6:
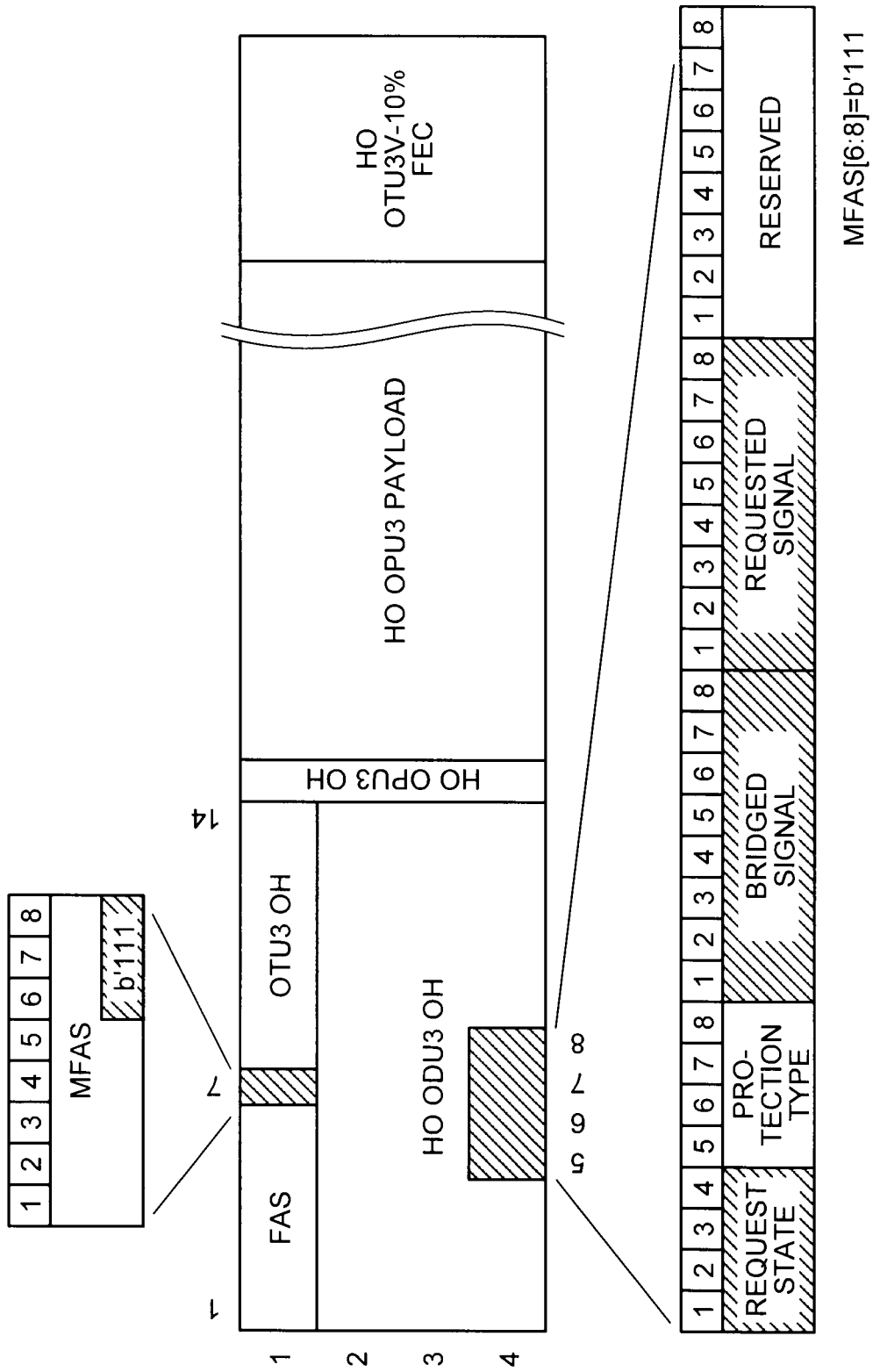
FIG. 6 is a detailed configuration example of the higher-order frame.

A method of controlling accommodation-mode switching according to the present embodiment is explained next. FIG. 6 is a detailed configuration example of the higher-order frame according to the present embodiment. FIG. 7 is an example of a procedure of controlling the accommodation-mode switching according to the present embodiment.

Generally, for transmitting and receiving information related to accommodation-mode switching between modes at the time of a failure or the like, it is possible to use APS byte in an OH area of an OTN frame. It is possible to use APS (Automatic Protection Switching) byte in an LO ODU2 OH shown in FIG. 3. This APS byte includes bits indicating Request/state, Protection type, Requested Signal, and Bridged Signal.

For example, it is possible to perform a control of switching between nodes by storing switching reason such as an SF (Signal Fail)/request state in the Request/state of the APS byte, a switching type (information on whether it is N:1 switching or 1+1 switching) in the Protection type, a switching request wavelength number in the Requested Signal, and a wavelength number bridged at the transmission side in the Bridged Signal and notifying this method.

It is assumed that the transmission-side operating muxponders 3-1 to 3-N and the reception-side operating muxponders 12-1 to 12-N notify the switching reason/request state with an APS message by using the APS byte in the same manner as conventional technologies.

In the present embodiment, the OH bit of the higher-order frame is used for selecting an accommodation mode of a redundant muxponder that is in standby. A six-byte frame alignment signal (FAS) indicating a start position of a frame is stored in an FA (Frame Alignment) OH of the HO ODU3 frame shown in FIG. 6. One byte after that is defined as an area for a multi-frame alignment signal (MFAS). A counter value that is incremented in a constantly circulating manner as 0x00, 0x01, 0x02, . . . , 0xFE, 0xFF, 0x00 for each frame is stored in the multi-frame alignment signal, which is used when configuring a multi-frame by placing a plurality of frames by using this counter value. In the present embodiment, a control of changing the accommodation mode of the redundant muxponder is performed by using a multi-frame APS byte when values from the sixth bit to the eighth bit are all "1" (b111) from among eight bits of an area of the MFAS. Although the control of changing the accommodation mode of the redundant muxponder is performed by the multi-frame APS byte when the values from the sixth bit to the eighth bit of the MFAS are all "1", it is also possible to perform the control of changing the accommodation mode by using the other frames of the HO ODU3 frame or a multi-frame OH area.

FIG. 7 is an example in which a node (Node) A including a transmitting unit and a receiving unit according to the present embodiment and a node (Node) Z including a transmitting unit and a receiving unit according to the present embodiment perform a communication with each other. At a normal time, each of the node A and the node Z transmits an NR frame with an NR (No Request) stored in a Request/state portion of an APS byte (Step S1 and Step S2).

Subsequently, a failure occurs at a wavelength on a transmission path from the node A to the node Z (Step S3), and the receiving unit of the node Z detects the failure (Step S4). The detection of the failure can be made using any kind of method, and for example, it is determined that the failure is detected when a frame that is received at regular intervals is not received for a predetermined time.

The receiving unit of the node Z notifies the transmitting unit of an occurrence of the failure with the wavelength at which the failure is detected, and the transmitting unit transmits an "SF 1, 0" frame in which a wavelength containing wavelength number information for which the failure is detected is stored to the node A. The "SF 1, 0" frame indicates that an SF has occurred in the Request/state portion of the APS byte and switching is requested to the counterpart.

Upon reception of the "SF 1, 0" frame (Step S5), the receiving unit of the node A performs switching of the transmission-side optical switches 5-1 to 5-4 in such a manner that a client signal bundle corresponding to the wavelength notified by the "SF 1, 0" frame is output to the transmission-side redundant muxponder 6 (Step S6), and performs switching of the accommodation modes of channels (four channels respectively corresponding to the XFPs 21-1 to 21-4) of the transmission-side redundant muxponder 6. The transmitting unit of the node A further transmits a "RR 1, 1" frame indicating that switching has been performed due to the failure to the node Z. The switching of the transmission-side optical switches 5-1 to 5-4 and the transmission of the "RR 1, 1" frame described above are performed within a time short enough compared to a required time for switching the transmission-side optical switches 5-1 to 5-4 and a required time for switching the accommodation modes (for example, within 10 milliseconds), that is, substantially at the same time.

The switching of the accommodation modes of the transmission-side redundant muxponder 6 may require a time longer than a time until the "RR 1, 1" frame described above.

Furthermore, it may not be possible to generate the low-order frame for a certain time at a channel at which the switching of the accommodation modes of the transmission-side redundant muxponder 6 is performed. Therefore, for example, when an APS control is being performed using the low-order frame, a delay can possibly occur such as the transmission delay of the "RR 1, 1" frame. However, because the APS control is performed using the OH of the higher-order frame in the present embodiment, such a problem does not occur. That is, it is possible to continue the APS control sequence even during performing switching of the accommodation modes of the transmission-side redundant muxponder 6.

The required time for switching the accommodation modes depends on a mode of each channel in a standby state of the transmission-side redundant muxponder 6 before the switching of the accommodation modes. For example, when two channels from among the four channels have the same accommodation mode in the standby state before the switching and after the switching, it is possible to continue the communication in the same accommodation mode without performing the switching, and reconfiguration (switching) can only be performed on the other two channels. For example, when there is a client signal bundle having a high priority from among client signal bundles, if the accommodation modes of the transmission-side redundant muxponder 6 and the reception-side redundant muxponder 14 in the standby state are set to the client signal bundle having the high priority, it is possible to continue the communication in the set accommodation mode without performing the switching of the accommodation modes (without any additional interruption of communication due to the switching of the accommodation modes). In addition, it is possible to set client signals having a high priority in the client signal bundle having the high priority to, for example, a first port, a second port and the like, and set a first port and a second port of the transmission-side redundant muxponder 6 and the reception-side redundant muxponder 14 in the standby state to the accommodation mode of the client signal bundle. The agreement of such setting of the ports in the standby state (a control of setting the accommodation mode) can be performed by using the multi-frame APS byte, by using a control monitoring communication path of a totally separate channel, or can be defined in a fixed manner at the time of establishing a network.

FIG. 7 is an example in which two channels from among four channels need switching of accommodation modes indicating a required time for switching the accommodation modes with a rectangle that changes its color from white to black.

Upon reception of the "RR 1, 1" frame (Step S7), the node Z performs switching of the accommodation modes of the reception-side redundant muxponder 14. The node Z then performs switching of the transmission-side optical switches 5-1 to 5-4 configured in the same manner in an opposite direction and switching of the accommodation modes of the transmission-side redundant muxponder 6 (Step S8), and transmits the "SF 1, 1" frame indicating that the switching has performed due to the failure to the node A (Step S9). With these processes, switching processes of the transmitting unit and the receiving unit are completed in both directions except for a change of the accommodation modes of the transmission-side redundant muxponder 6 and the reception-side redundant muxponder 14 (change of the interface type of the client signal).

After a time equal to or longer than a required time for changing the accommodation mode of the transmission-side redundant muxponder 6 or a required time for switching the transmission-side optical switches 5-1 to 5-4, whichever is longer, has elapsed since the "RR 1, 1" frame had been received, the node A performs switching of the reception-side optical switches 13-1 to 13-4.

Furthermore, after a time equal to or longer than a required time for changing the accommodation mode of the transmission-side redundant muxponder 6 or a required time for switching the transmission-side optical switches 5-1 to 5-4, whichever is longer, has elapsed since the "SF 1, 1" frame had been received, the node Z performs switching of the reception-side optical switches 13-1 to 13-4. With this procedure, the whole switching process including switching of the receiving unit and the accommodation modes is completed.

Although the node Z is configured to perform the switching of the reception-side optical switches 13-1 to 13-4 after the required time for changing the accommodation mode of the transmission-side redundant muxponder 6 or the required time for switching the transmission-side optical switches 5-1 to 5-4, whichever is longer, has elapsed since the "SF 1, 1" frame had been received, it can be configured that the node Z performs the switching of the reception-side optical switches 13-1 to 13-4 after the required time for changing the accommodation mode of the transmission-side redundant muxponder 6 or the required time for switching the transmission-side optical switches 5-1 to 5-4, whichever is longer, has elapsed since the "SF 1, 0" frame had been received. Similarly, although the node Z is configured to perform the switching of the transmission-side optical switches 5-1 to 5-4 and the accommodation modes simultaneously with the reception of the "SF 1, 1" frame or within a shorter time, it can be configured that the node Z performs the switching of the transmission-side optical switches 5-1 to 5-4 and the accommodation modes simultaneously with the reception of the "SF 1, 0" frame.

At the node A and the node Z, it can be configured that completion of the switching of the accommodation modes of the transmission-side redundant muxponder 6 and the reception-side redundant muxponder 14 are monitored for each client signal channel and the switching of the transmission-side optical switches 5-1 to 5-4 is performed in an independent manner for each client signal channel based on a result of the monitoring.

Furthermore, at the node A and the node Z, it can be configured that the switching of the transmission-side optical switches 5-1 to 5-4 is performed in an independent manner for each client signal channel based on a required time for switching the accommodation modes of the transmission-side redundant muxponder 6 and the reception-side redundant muxponder 14 for each channel. For example, in the example shown in FIG. 7, it can be configured that different channels are instructed as switching targets by using the multi-frame APS byte or a multi-frame byte different from the multi-frame APS byte in the "SF 1, 0" frame and in the "SF 1, 1" frame, and the whole switching process is completed with two times of switching operations.

In this manner, in the present embodiment, it is configured that the accommodation mode of the redundant muxponder can be set independently for each channel of a client signal. Therefore, when accommodating client interfaces in a multiplexing manner by using a muxponder, it is possible to perform redundant switching by one redundant wavelength for a channel that does not need switching of the accommodation modes, for example, only with an instantaneous interruption due to an optical switch of about a few milliseconds, without wasting any additional time for switching the accommodation modes. In addition, it is possible to achieve a reduction of a failure recovery time.

According to the present invention, it is possible to perform redundant switching by one redundant wavelength when accommodating client interfaces in a multiplexing manner using a muxponder.

The present invention has been achieved in view of the above problems, and an object of the present invention is to provide an optical network system and a WDM apparatus that can perform redundant switching by one redundant wavelength when client interfaces are accommodated in a multiplexing manner using a muxponder.

What is claimed is:

1. An optical network system that performs transmission of N:1 protection with respect to client signals of M×N channels constituting a signal bundle with M channels, where M is an integer equal to or larger than 2 and N is an integer equal to or larger than 1, wherein
the client signal includes a plurality of types of signals, and
the optical network system comprises:
a transmission-side optical redundant switching device including
a transmission-side operating muxponder that generates a multiplexed signal for each of the signal bundles by performing a multiplexing process including a predetermined transmission-side process according to a type of the client signal on the client signals, and converts each multiplexed signal into an operating optical signal having a different wavelength,
a transmission-side optical coupler that branches the client signal into an operating signal and a redundant signal for each channel of the client signals,
M parallel transmission-side optical switches each selecting one channel from among the redundant signals of the N signal bundles, and outputs a selected redundant signal as a redundant client signal, and
a transmission-side redundant muxponder that generates a multiplexed signal by performing a multiplexing process including a predetermined transmission-side process according to a type of the signal on the M-channel redundant client signals, converts the multiplexed signal into a redundant optical signal having a wavelength different from that of the operating optical signal, and performs a process according to the type by setting an accommodation mode corresponding to the type in the predetermined transmission-side process, thereby making the accommodation mode settable for each channel in an independent manner; and
a reception-side optical redundant switching device including
a first WDM device that multiplexes the operating optical signal and the redundant optical signal by a wavelength, and outputs a wavelength-multiplexed signal to an optical transmission path,
a second WDM device that demultiplexes a wavelength-multiplexed signal input from the optical transmission path, and outputs wavelength-demultiplxed signals,
a reception-side operating muxponder that generates an output client signal by performing a demultiplexing process including a predetermined reception-side process according to a type of the client signal on the operating optical signal from among the wavelength-demultiplexed signals,
a reception-side redundant muxponder that generates an output client signal by performing a demultiplexing process including a predetermined reception-side process according to a type of the client signal on the redundant signal from among the wavelength-demultiplexed signals, and performs a process according to the type by setting an accommodation mode corresponding to the type in the predetermined reception-side process, thereby making the accommodation mode settable for each channel in an independent manner,
a reception-side optical coupler that is provided for each channel of the client signals and optically couples an output client signal generated by the reception-side redundant muxponder and an output client signal generated by the reception-side operating muxponder, and
a reception-side optical switch that selects a reception-side optical coupler corresponding to a channel selected by the transmission-side optical switch as an output destination of an output client signal generated by the reception-side redundant muxponder, and outputs an output client signal generated by the reception-side redundant muxponder to a selected reception-side optical coupler.

2. The optical network system according to claim 1, wherein the transmission-side redundant muxponder generates a transmission clock used when performing the multiplexing process independently of a clock extracted from the client signal.

3. The optical network system according to claim 1, wherein the transmission-side redundant muxponder and the reception-side redundant muxponder can set an accommodation mode at a time of standby during which a process related to the redundant signal is not performed for each channel in an arbitrary manner.

4. The optical network system according to claim 1, wherein the reception-side optical redundant switching device perform a notification on a switching control of an accommodation mode by using an overhead byte of a higher-order frame in a multi-frame based on ITU-T G.709.

5. The optical network system according to claim 1, further comprising:
a first redundant switching device having a function as the transmission-side optical redundant switching device and a function as the reception-side optical redundant switching device; and
a second redundant switching device having a function as the transmission-side optical redundant switching device and a function as the reception-side optical redundant switching device, the second redundant switching device being opposite to the first redundant switching device, wherein
upon detection of an occurrence of a failure on a path between the second redundant switching device and the first redundant switching device, the second redundant switching device transmits a first notification notifying the occurrence of the failure to the first redundant switching device, and
upon reception of the first notification, the first redundant switching device performs switching of the transmission-side optical switches, switching of accommodation modes of the transmission-side redundant muxponder, and transmission of a second notification that is a response to the first notification to the second redundant switching device, within a time shorter than a time for converting the accommodation modes and a time for switching the transmission-side optical switches.

6. The optical network system according to claim 5, wherein, upon reception of the second notification, the second redundant switching device performs switching of the transmission-side optical switches, switching of accommodation modes of the transmission-side redundant muxponder, and transmission of a third notification notifying that switching due to a failure is completed to the first redundant switching device, within a time shorter than a time for converting the accommodation modes and a time for switching transmission-side optical switches.

7. The optical network system according to claim 5, wherein the second redundant switching device performs switching of the reception-side optical switch after standing by for a time longer than a time for converting the accommodation modes and a time for switching the transmission-side optical switches has elapsed since receiving the second notification.

8. The optical network system according to claim 5, wherein the first redundant switching device performs switching of the reception-side optical switch after standing by for a time longer than a time for converting the accommodation modes and a time for switching the transmission-side optical switches has elapsed since receiving the first notification.

9. The optical network system according to claim 1, further comprising:
a first redundant switching device having a function as the transmission-side optical redundant switching device and a function as the reception-side optical redundant switching device; and
a second redundant switching device having a function as the transmission-side optical redundant switching device and a function as the reception-side optical redundant switching device, the second redundant switching device being opposite to the first redundant switching device, wherein
upon detection of an occurrence of a failure on a path between the second redundant switching device and the first redundant switching device, the second redundant switching device transmits a first notification notifying the occurrence of the failure to the first redundant switching device, and
upon reception of the first notification, the first redundant switching device performs transmission of a second notification that is a response to the first notification to the second redundant switching device.

10. The optical network system according to claim 9, wherein the second redundant switching device performs switching of the reception-side optical switch after standing by for a time longer than a time for converting the accommodation modes and a time for switching the transmission-side optical switches has elapsed since receiving the second notification.

11. The optical network system according to claim 9, wherein, upon reception of the second notification, the second redundant switching device performs switching of the transmission-side optical switches, switching of accommodation modes of the transmission-side redundant muxponder, and transmission of a third notification notifying that switching due to a failure is completed to the first redundant switching device, within a time shorter than a time for converting the accommodation modes and a time for switching transmission-side optical switches.

12. The optical network system according to claim 11, wherein after receiving the third notification, the first redundant switching device performs switching of the transmission-side optical switches and switching of accommodation modes of the transmission-side redundant muxponder, within a time shorter than a time for converting the accommodation modes and a time for switching the transmission-side optical switches.

13. The optical network system according to claim 11, wherein the first redundant switching device performs switching of the reception-side optical switch after standing by for a time longer than a time for converting the accommodation modes and a time for switching the transmission-side optical switches has elapsed since receiving the third notification.

14. The optical network system according to claim 5, wherein the first redundant switching device and the second redundant switching device compare an accommodation mode set to the reception-side operating muxponder corresponding to a client signal bundle for which a failure is detected with an accommodation mode set in a standby time of the transmission-side redundant muxponder and the reception-side redundant muxponder for each client signal channel, and do not perform a reset of the accommodation mode for a channel in which the accommodation modes match each other.

15. The optical network system according to claim 5, wherein the first redundant switching device and the second redundant switching device monitor a completion of switching of the accommodation modes in the transmission-side redundant muxponder and the reception-side redundant muxponder for each client signal channel, and perform switching of the transmission-side optical switches based on a result of monitoring for each client signal channel in an independent manner.

16. The optical network system according to claim 5, wherein the first redundant switching device and the second redundant switching device perform switching of the transmission-side optical switches based on a required time for each channel for switching the accommodation modes in the transmission-side redundant muxponder and the reception-side redundant muxponder for each client signal channel in an independent manner.

17. A WDM apparatus that performs transmission of N:1 protection with respect to client signals of M×N channels constituting a signal bundle with M channels, where M is an integer equal to or larger than 2 and N is an integer equal to or larger than 1, wherein
the client signal includes a plurality of types of signals, and the optical network system comprises:
a transmission-side optical redundant switching device including
a transmission-side operating muxponder that generates a multiplexed signal for each of the signal bundles by performing a multiplexing process including a predetermined transmission-side process according to a type of the client signal on the client signals, and converts each multiplexed signal into an operating optical signal having a different wavelength,
a transmission-side optical coupler that branches the client signal into an operating signal and a redundant signal for each channel of the client signals,
M parallel transmission-side optical switches each selecting one channel from among the redundant signals of the N signal bundles, and outputs a selected redundant signal as a redundant client signal, and
a transmission-side redundant muxponder that generates a multiplexed signal by performing a multiplexing process including a predetermined transmission-side process according to a type of the signal on the M-channel redundant client signals, converts the multiplexed signal into a redundant optical signal having a wavelength different from that of the operating optical signal, and performs a process according to the type by setting an accommodation mode corresponding to the type in the predetermined transmission-side process, thereby making the accommodation mode settable for each channel in an independent manner; and a reception-side optical redundant switching device including
a first WDM device that multiplexes the operating optical signal and the redundant optical signal by a wavelength, and outputs a wavelength-multiplexed signal to an optical transmission path,
a second WDM unit that demultiplexes a wavelength-multiplexed signal input from the optical transmission path from another one of the WDM apparatus,
a reception-side operating muxponder that generates an output client signal by performing a demultiplexing process including a predetermined reception-side process according to a type of the client signal on the operating optical signal from among the wavelength-demultiplexed signals,
a reception-side redundant muxponder that generates an output client signal by performing a demultiplexing process including a predetermined reception-side process according to a type of the client signal on the redundant signal from among the wavelength-demultiplexed signals, and performs a process according to the type by setting an accommodation mode corresponding to the type in the predetermined reception-side process, thereby making the accommodation mode settable for each channel in an independent manner,
a reception-side optical coupler that is provided for each channel of the client signals and optically couples an output client signal generated by the reception-side redundant muxponder and an output client signal generated by the reception-side operating muxponder, and
a reception-side optical switch that selects a reception-side optical coupler corresponding to a channel selected by the transmission-side optical switch as an output destination of an output client signal generated by the reception-side redundant muxponder, and outputs an output client signal generated by the reception-side redundant muxponder to a selected reception-side optical coupler.

18. The optical network system according to claim 9, wherein the first redundant switching device and the second redundant switching device compare an accommodation mode set to the reception-side operating muxponder corresponding to a client signal bundle for which a failure is detected with an accommodation mode set in a standby time of the transmission-side redundant muxponder and the reception-side redundant muxponder for each client signal channel, and do not perform a reset of the accommodation mode for a channel in which the accommodation modes match each other.

19. The optical network system according to claim 9, wherein the first redundant switching device and the second redundant switching device monitor a completion of switching of the accommodation modes in the transmission-side redundant muxponder and the reception-side redundant muxponder for each client signal channel, and perform switching of the transmission-side optical switches based on a result of monitoring for each client signal channel in an independent manner.

20. The optical network system according to claim 9, wherein the first redundant switching device and the second redundant switching device perform switching of the transmission-side optical switches based on a required time for each channel for switching the accommodation modes in the transmission-side redundant muxponder and the reception-side redundant muxponder for each client signal channel in an independent manner.

* * * * *